(12) United States Patent
Ichinokawa

(10) Patent No.: US 6,434,334 B2
(45) Date of Patent: Aug. 13, 2002

(54) LENS MOVING DEVICE

(75) Inventor: Kazuhiro Ichinokawa, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/874,281

(22) Filed: Jun. 6, 2001

(30) Foreign Application Priority Data

Jun. 14, 2000 (JP) ........................................ 2000-178543

(51) Int. Cl.[7] .............................. G03B 3/10; G02B 7/02
(52) U.S. Cl. ...................... 396/144; 359/823; 348/357
(58) Field of Search ........................ 396/144; 359/823; 348/357, 345

(56) References Cited

U.S. PATENT DOCUMENTS

| 4,506,959 A | 3/1985 | Hama | 359/706 |
| 5,659,810 A | 8/1997 | Nomura et al. | 396/72 |
| 5,748,394 A * | 5/1998 | Shimazaki et al. | 359/823 |
| 6,026,244 A | 2/2000 | Tanaka et al. | 396/72 |

* cited by examiner

Primary Examiner—W. B. Perkey
(74) Attorney, Agent, or Firm—Greenblum & Bernstein, P.L.C.

(57) ABSTRACT

A lens moving device comprises a lens frame to which a lens is attached and a drive mechanism which moves the lens frame along the optical axis of the lens. An arm-receiving opening is formed in a connecting member provided on the lens frame. The drive mechanism has a motor, and an output shaft of the motor is connected to a feed screw, on which a nut is fitted. A moving member is integrally formed on the nut, and first and second arms are provided on the moving member. The first and second arms are inserted into the arm-receiving opening. The first and second arms are arranged in order along the line, in which the lens is moved. A spring force of the first arm is greater than that of the second arm.

8 Claims, 4 Drawing Sheets

FORWARD DIRECTION

[STOPPING CONDITION]

[REARWARD DIRECTION MOVEMENT START]

[REARWARD DIRECTION MOVEMENT]

LENS MOVING DEVICE

BACKGROUND OF THE INVENTION

1. Field of the Invention

The present invention relates to a lens moving device which is provided in a digital camera, for example, to move a photographing lens along the optical axis thereof.

2. Description of the Related Art

Conventionally, there is known a lens moving device, provided in a digital camera, in which a nut is threaded on a feed screw directly connected to an output shaft of a motor and this nut is connected to a lens frame to which a photographing lens is attached, so that the photographing lens is moved to a target stopping-position in accordance with the result of photometry. In this device, the nut and the lens frame are connected to each other by inserting an arm member provided to the nut into an arm insertion opening formed in the lens frame. Accordingly, the driving force of the motor is transmitted to the lens frame and the photographing lens via the arm member.

If the spring force of the arm member is relatively small, the arm member will bend because of the load of the lens frame etc., to hence the lens frame and the photographing lens will not follow the operation of the motor and a delay will occur. Namely, the driving force of the motor required to move the lens to the target stopping-position, is not exactly transmitted to the photographing lens. Therefore, for reducing the bend caused by lens movement, an arm member having a large spring force is suitable. However, when the arm member is inserted into the arm insertion opening during the assembling process of the device, the arm member should be bent, and if the spring force of the arm member is too large, the assembly would be difficult.

SUMMARY OF THE INVENTION

Therefore, an object of the present invention is to provide a lens moving device in which the spring force is large enough to provide precise control of the position of the photographing lens, and for which the assembling process is easy.

According to the present invention, there is provided a lens moving device comprising a support mechanism and a drive mechanism. The support mechanism supports a lens in such a manner that the lens moves along the optical axis thereof. The support mechanism is provided with a single arm-receiving opening. The drive mechanism moves the lens along the optical axis. The drive mechanism is provided with a first arm having a first spring force, and a second arm having a second spring force less than the first spring force. The first and second arms are arranged in order along the line, in which the lens is moved, and they are inserted in the arm-receiving opening so that the drive mechanism is connected to the support mechanism.

Further, according to the present invention, there is provided a device for moving a lens along the optical axis thereof, the device comprising a lens frame to which the lens is attached and a drive mechanism. The lens frame is provided with an arm-receiving opening. The drive mechanism moves the lens frame along the optical axis. The drive mechanism is provided with first and second arms. The first arm has a spring force, which is greater than that of the second arm. The first and second arms are extended perpendicularly to the optical axis, and inserted in the arm-receiving opening so that the drive mechanism is connected to the support mechanism.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
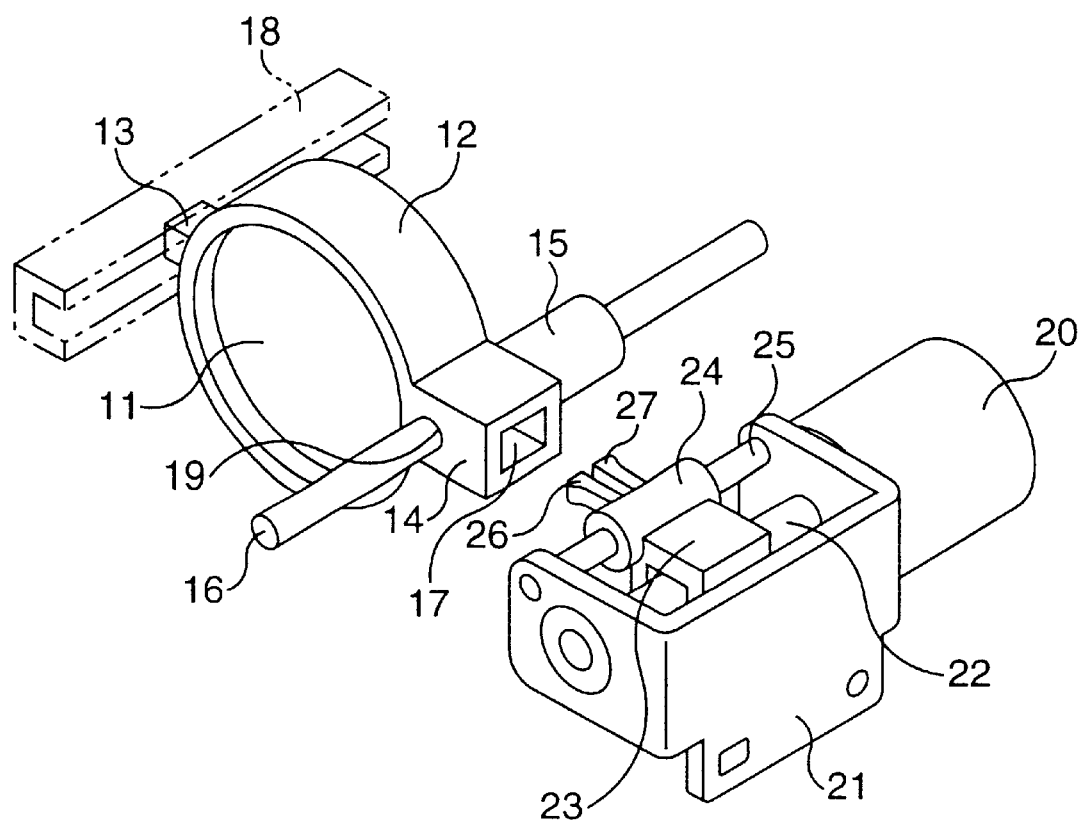
FIG. 1 is a disassembled perspective view showing a lens moving device of an embodiment of the present invention.

The present invention will be described below with reference to an embodiment shown in the drawings.

FIG. 1 is a disassembled perspective view of a lens moving device of the embodiment of the present invention, which moves a photographing lens along the optical axis thereof so as to carry out a focusing operation of the photographing lens.

A lens 11 is attached to a lens frame 12. The lens frame 12 is ring-shaped, and a guide projection 13 and a connecting member 14 are formed on the outer surface of the lens frame 12. The guide projection 13 and the connecting member 14 are located at opposite positions with respect to the center of the lens frame 12. A tubular member 15, which is extended in a direction parallel to the optical axis of the lens 11, is integrally formed on a side surface of the connecting member 14. A cylindrical hole 19, which is coaxial with a hole (not shown) in the tubular member 15 is formed in the connecting member 14. The connecting member 14 is provided with a single arm-receiving opening 17 which opens vertically to the optical axis of the lens 11 and has a rectangular section.

A lens guide shaft 16 and a guide member 18 are parallel to the optical axis of the lens 11. The section of the guide member 18 is channel-shaped, and the guide projection 13 is engaged with the guide member 18 to move along the optical axis of the lens 11. The lens guide shaft 16 is inserted in a cylindrical hole 19 formed in the connecting member 14 and the hole of the tubular member 15, such that the connecting member 14 and the tubular member 15 can slide relative to the lens guide shaft 16. Thus, the lens frame 12 is supported by the lens guide shaft 16 and the guide member 18, so that the lens frame 12 can move along the optical axis of the lens 11. Namely, a support mechanism is formed by the guide projection 13, the guide member 18, the connecting member 14, the tubular member 15, and the lens guide shaft 16.

The motor 20 is fixed on an outer side surface of a motor attaching plate 21, which is bent in a channel-shape. An output shaft of the motor 20 passes through the motor attaching plate 21, and is connected to a feed screw 22, which is arranged parallel to the lens guide shaft 16 and the guide member 18. A nut 23 is threadingly fitted on the feed screw 22. A cylindrical moving member 24 is integrally connected to the nut 23. A hole having a circular section is formed in the moving member 24, and a nut guide shaft 25 is inserted in the hole. Both of the ends of the nut guide shaft 25 are fixed to opposite sides of the motor attaching plate 21, and the guide shaft 25 is parallel to the feed screw 22. Accordingly, when the feed screw 22 is rotated by driving the motor 20, the nut 23 is displaced along the longitudinal direction of the feed screw 22, so that the moving member 24 is moved along the nut guide shaft 25.

First and second arms 26 and 27, which are extended perpendicularly to the nut guide shaft 25 and the optical axis, are integrally connected to the moving member 24. The arms 26 and 27 are inserted in the arm-receiving opening 17, so that the lens frame 12 and the moving member 24 are connected to each other. Thus, when the motor 20 is rotated, the moving member 24 is moved, so that the lens 11 and the lens frame 12 are moved or driven. Namely, a drive mechanism is formed by the motor 20, the feed screw 22, the nut 23, the moving member 24, and the nut guide shaft 25.

Figure 2:
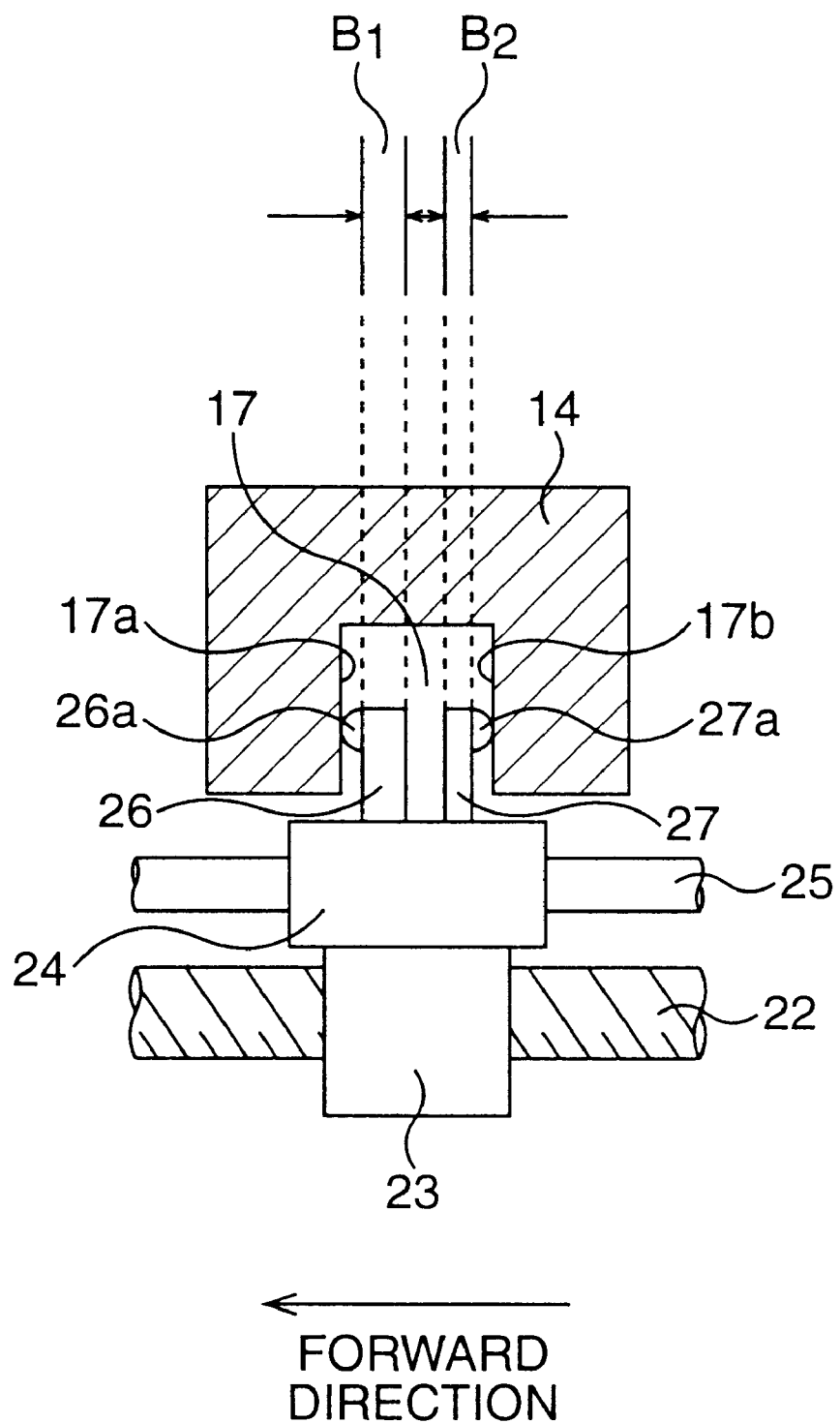
FIG. 2 is a view showing a construction in which a moving member is connected to a connecting member.

FIG. 2 shows a construction in which the moving member 24 is connected to the connecting member 14.

The arm-receiving opening 17 has side walls 17a and 17b. The first and second arms 26 and 27 are extended perpendicularly to the nut guide shaft 25, and are inserted in the arm-receiving opening 17. Tip portions 26a and 27a of the first and second arms 26 and 27 are projected toward the side walls 17a and 17b to contact the side walls 17a and 17b. Thus, the first and second arms 26 and 27 are slightly bent inward, as shown in FIG. 2, since the tip portions 26a and 27a are engaged with or press against the side walls 17a and 17b. Namely, the lens 11 is urged leftward in FIGS. 1 and 2 by the first arm 26, and is urged rightward in FIG. 1 and 2 by the second arm 27.

The direction in which the lens 11 is moved to the front of the camera body is defined as the forward direction (the leftward direction in FIGS. 1 and 2), and the direction in which the lens 11 is moved to the rear of the camera body is defined as the rearward direction (the rightward direction in FIGS. 1 and 2). Namely, the first and second arms 26 and 27 are arranged in the forward direction, and the breadth B1 of the first arm 26 positioned at the forward direction side is wider than the breadth B2 of the second arm 27 positioned at the rearward direction side, as shown in FIG. 2. Therefore, regarding the flexural rigidity of each of the first and second arms 26 and 27 in the moving direction, the spring force of the first arm 26 is greater than that of the second arm 27.

Figure 3:
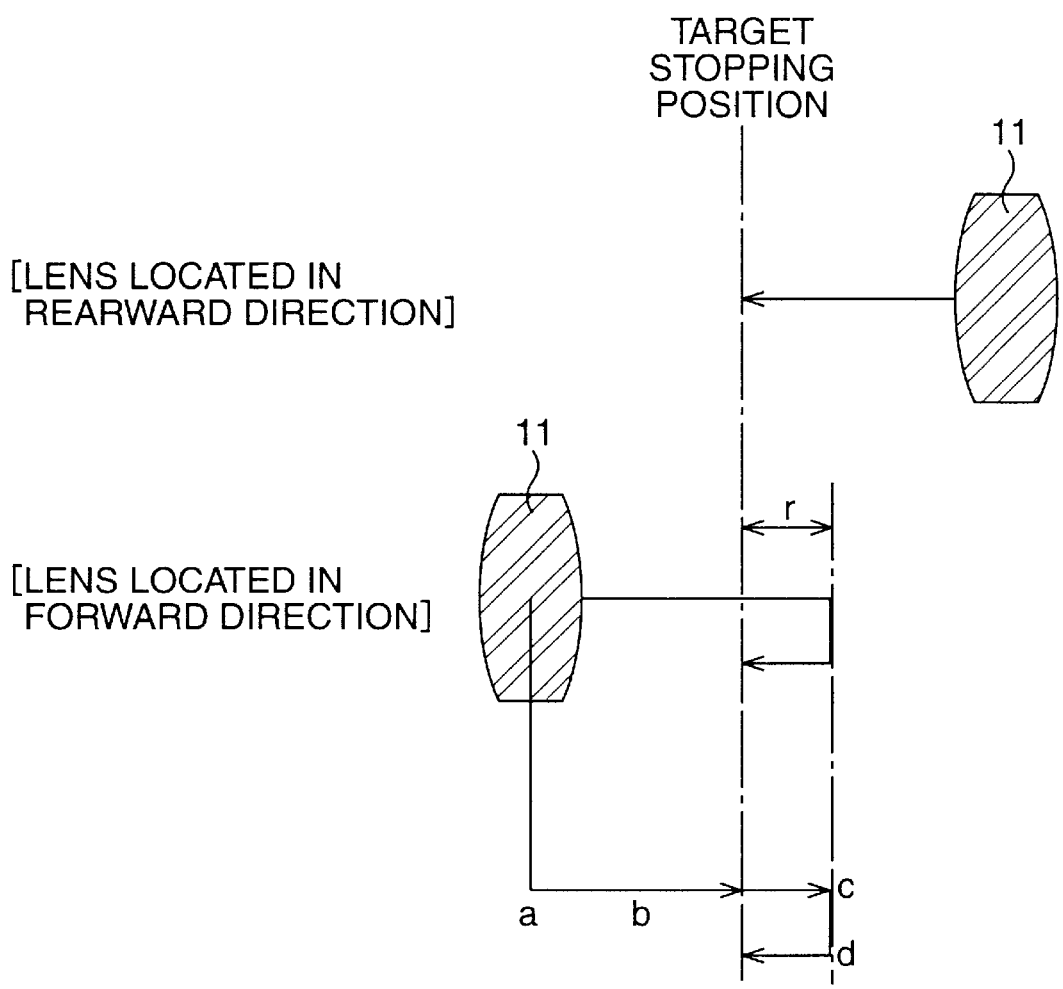
FIG. 3 is a view schematically showing a movement of a lens.
Figure 4A:
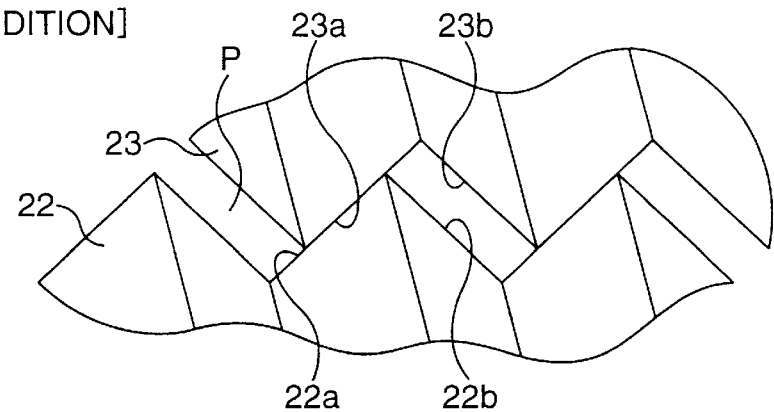
FIGS. 4A, 4B, and 4C are views showing positional relationships of portions of a feed screw and a nut.
Figure 4B:
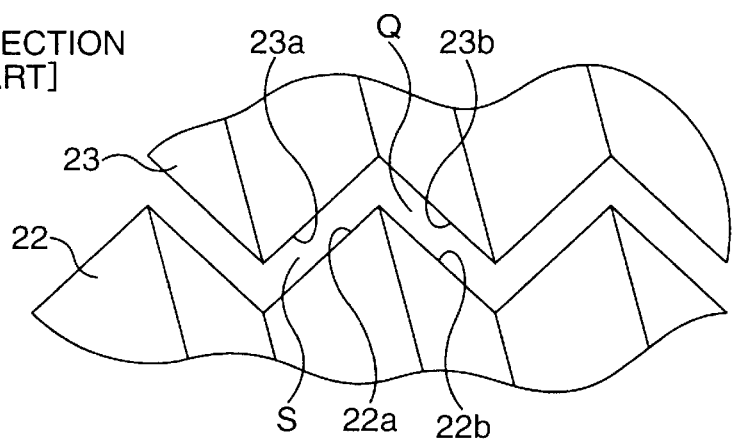
Figure 4C:
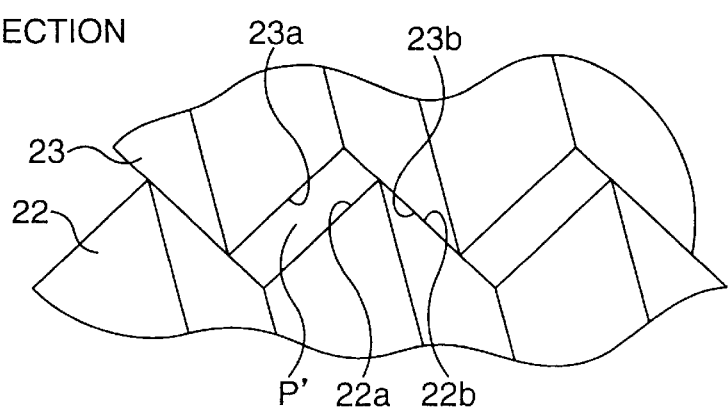

With reference to FIGS. 1, 2, 3, 4A, 4B, and 4C, the operation of the embodiment is described below. FIG. 3 schematically shows the movement of the lens, and Figs. 4A, 4B, and 4C show the positional relationship of portions, which are enlarged, of the feed screw 22 and the nut 23 which are threaded.

The lens 11 is moved by the motor 20. The direction of the rotation and the amount of movement of the motor 20 are set in accordance with the position of the lens 11, which is calculated based on information about the distance, from the camera to the subject, sensed by the photometry sensor (not shown). When the lens 11 is moved continuously in a constant direction, the driving force of the motor 20 is transmitted to the nut 23 always through the feed screw 22. However, when the direction of movement of the lens 11 is reversed, play P occurs between feed screw 22 and the nut 23 as shown in FIG. 4A. Therefore, a delay exists in the movement of the lens 11, because of the play P, until the nut 23 follows the drive of the feed screw 22, so that the motor 20 idles. Thus, an error occurs between the target stopping-position and the actual stopping-position of the lens 11, and the amount of the error corresponds to the idle of the motor 20. Therefore, in the embodiment, the movement of the lens 11 is performed as described below, so that the accuracy of the stopping-position of the lens 11 is improved.

Regarding the first and second arms 26 and 27 connecting the moving member 24 to the lens frame 12, the first arm 26 having the relatively large spring force is positioned at the front side in the forward direction, and in the stopping condition of the lens 11, the forward direction side surface 22a of the feed screw 22 is in contact with a rearward direction side surface 23a of the nut 23, as shown in FIG. 4A.

When the lens 11 is located behind the target stopping-position, the lens 11 is continuously moved toward the target stopping-position, and is stopped at the target stopping-position, as shown in FIG. 3. At this time, since the feed screw 22 and the nut 23 are moved keeping the positional relationship of the stopping condition (see FIG. 4A), the motor 20 does not idle, and thus the driving force of the motor 20 is transmitted to the lens 11 through the nut 23.

When the lens 11 is located in front of the target stopping-position, the lens 11 is moved in the rearward direction to a predetermined position as shown by references "a", "b", and "c" in FIG. 3, and the moving direction is then reversed so that the lens 11 is moved in the forward direction (reference "d").

While the lens 11 is stopped (reference "a"), the forward direction side surface 22a of the feed screw 22 is in contact with the rearward direction side surface 23a of the nut 23 ("STOPPING CONDITION" of FIG. 4A). When the lens 11 starts to move in the rearward direction (reference "b"), although the feed screw 22 is driven due to the rotation of the motor 20, the driving force of the motor 20 in the rearward direction is not transmitted to the nut 23, since a gap Q exists in the direction in which the spiral ridge of the feed screw 22 proceeds. Accordingly, the nut 23 is kept stationary. Namely, the motor 20 idles. The spiral ridge of the feed screw 22 is then separated from the spiral ridge of the nut 23 which is stationary, so that a gap S occurs between the forward direction side surface 22a of the feed screw 22 and the rearward direction side surface 23a of the nut 23 ("REARWARD DIRECTION MOVEMENT START" of FIG. 4B).

When the spiral ridge of the feed screw 22 proceeds in the rearward direction by the size of the play P, the rearward direction side surface 22b of the feed screw 22 comes into contact with the forward direction side surface 23b of the nut 23. Due to this, a play P' occurs between the forward direction side surface 22a of the feed screw 22 and the rearward direction side surface 23a of the nut 23 ("REARWARD DIRECTION MOVEMENT" of FIG. 4C). In this condition, the driving force of the nut 23 is transmitted to the nut 23, so that the lens 11 is moved in the rearward direction through the nut 23. The lens 11 is not stopped at the target stopping-position, but is moved in the rearward direction to a position separated from the target stopping-position by the distance "r" and is stopped (reference "c"). At this time, the positional relationship between the feed screw 22 and the nut 23 keeps the condition of the rearward direction movement. Note that the distance "r" is large enough relative to the amount of the play P'.

The lens 11 located at a position which is separated from the target stopping-position in the rearward direction by the distance "r", is reversed in the moving direction, and moved in the forward direction toward the target stopping-position. When the lens 11 starts to reverse (reference "d"), the gaps Q and S occur similar to the rearward direction movement start condition. Thus, the driving force in the forward direction is not transmitted to the nut 23, so that the nut 23 keeps stationary. Namely, the motor 20 idles. After that, when the spiral ridge of the feed screw 22 proceeds by the amount of the play P', the forward direction side surface 22a of the feed screw 22 and the rearward direction side surface 23a of the nut 23 come into contact, and thus the positional relationship becomes the same as that of the stopping condition shown in FIG. 4A. In this state, the driving force of the motor 22 is transmitted to the nut 23, so that the lens 11 is moved in the forward direction through the nut 23. The lens 11 is moved by the distance "r" to stop at the target stopping-position.

As described above, when the lens 11 is located in the rearward direction with respect to the target stopping-position, the positional relationship between the feed screw 22 and the nut 23 is kept in a state in which the play P does not affect the movement of the lens 11. Therefore, the lens 11 can be moved exactly to the target stopping-position. On the other hand, when the lens 11 is located in the forward direction with respect to the target stopping-position, the lens 11 is moved in the rearward direction by the distance "r" which is larger than the play P, and is then moved forward, so that the lens 11 can be positioned exactly at the target stopping-position.

Thus, the lens 11 is always moved in the forward direction to stop at the target stopping-position. In the forward movement, although a load acts on the first arm 26, since the first arm 26 has a relatively large spring force, the deflection of the first arm 26 is small, so that the lens 11 can be stopped exactly at the target stopping-position. Conversely, if the spring force of the first arm 26 were relatively small, the deflection generated in the forward movement would be large and the lens 11 would stop at a position offset from the target stopping-position. In the embodiment, although such a phenomenon occurs in the rearward movement, the moving direction of the lens 11 is reversed at a position where the lens 11 passes the target stopping-position, and is stopped at the target stopping-position after the forward movement, and therefore, the deflection is restrained to a relatively small amount.

With reference to FIG. 2, an assembly process of the embodiment is described below.

The tip portions 26a and 27a of the first and second arms 26 and 27 are projected toward the side walls 17a and 17b of the arm-receiving opening 17. In an inserting process in which the first and second arms 26 and 27 are inserted into the arm-receiving opening 17, the tip portions 26a and 27a slide along the side walls 17a and 17b. Since the breadth from the tip portion 26a to the tip portion 27a is wider than that of the arm-receiving opening 17, the first and second arms 26 and 27 need to be bent inside. By provision of the second arm 27 having a relatively small spring force, one of the arms is bent with a small load, and thus the arms 26 and 27 are easily inserted in the arm-receiving opening 17.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-178543 (filed on Jun. 14, 2000) which is expressly incorporated herein, by reference, in its entirety.

What is claimed is:

1. A lens moving device comprising:

a support mechanism that supports a lens in such a manner that said lens moves along the optical axis thereof, said support mechanism being provided with a single arm-receiving opening; and a drive mechanism that moves said lens along the optical axis, said drive mechanism being provided with a first arm having a first spring force, and a second arm having a second spring force less than said first spring force, said first and second arms being arranged in order along the line, in which said lens is moved, and inserted in said arm-receiving opening so that said drive mechanism is connected to said support mechanism.

2. A device according to claim 1, wherein said arm-receiving opening has side walls, and said first and second arms are engaged with said side walls.

3. A device according to claim 2, wherein said first and second arms have tip portions, which are projected toward said side walls.

4. A device according to claim 1, wherein said lens is always moved in a predetermined direction before said lens is stopped at a target stopping-position, said first arm being positioned in front of said second arm in relation to said predetermined direction.

5. A device according to claim 1, wherein the breadth in said forward direction of said first arm is wider than that of said second arm.

6. A device according to claim 1, wherein said lens is a photographing lens provided in a digital camera.

7. A device for moving a lens along the optical axis thereof, said device comprising:

a lens frame to which said lens is attached, said lens frame being provided with an arm-receiving opening; and a drive mechanism that moves said lens frame along the optical axis, said drive mechanism being provided with first and second arms, said first arm having a spring force, which is greater than that of said second arm, said first and second arms being extended perpendicularly to the optical axis, and inserted in said arm-receiving opening so that said drive mechanism is connected to said support mechanism.

8. A device for moving a lens along the optical axis thereof, said device comprising:

means for supporting said lens in such a manner that said lens moves along the optical axis;

means for urging said lens in a first direction, in which said lens is moved, with a first spring force, and in a second direction, which is opposite to said first direction, with a second spring force, which is less than said first spring force.

* * * * *